United States Patent [19]

Mafoti et al.

[11] Patent Number: 5,407,596
[45] Date of Patent: Apr. 18, 1995

[54] POLYOLS FOR THE PRODUCTION OF FOAMS WITH HCFC BLOWING AGENTS

[75] Inventors: Robson Mafoti, Pittsburgh; Richard E. Keegan, McMurray, both of Pa.; Steven L. Schilling, Glen Dale, W. Va.

[73] Assignee: Miles Inc., Pittsburgh, Pa.

[21] Appl. No.: 241,820

[22] Filed: May 12, 1994

[51] Int. Cl.$^6$ .................. C08G 18/06; C08G 18/28
[52] U.S. Cl. .................. 252/182.24; 521/131; 521/175
[58] Field of Search .................. 521/131, 175; 252/182.24

[56] References Cited

U.S. PATENT DOCUMENTS

| | | | |
|---|---|---|---|
| 3,085,085 | 4/1963 | Wismer et al. | 260/209 |
| 3,153,002 | 10/1964 | Wismer et al. | 260/2.5 |
| 3,222,357 | 12/1965 | Wismer et al. | 260/209 |
| 4,230,824 | 10/1980 | Nodelman | 521/175 |
| 4,417,998 | 11/1983 | Kennedy | 521/175 |
| 4,430,490 | 2/1984 | Doerge | 528/77 |
| 4,642,319 | 2/1987 | McDaniel | 521/175 |
| 4,900,365 | 2/1990 | Lund et al. | 134/12 |
| 5,137,929 | 8/1992 | Demmin et al. | 521/99 |
| 5,177,119 | 1/1993 | Motte | 521/175 |
| 5,194,175 | 3/1993 | Keske et al. | 521/175 |
| 5,225,101 | 7/1993 | Yamamori | 521/175 |

OTHER PUBLICATIONS

Dishart et al "The DuPont Program on Fluorocarbon Alternative Blowing Agents for Polyurethane Foams", Polyurethanes World Congress 1987, pp. 59–66.

*Primary Examiner*—Morton Foelak
*Attorney, Agent, or Firm*—Joseph C. Gil; Lyndanne M. Whalen

[57] ABSTRACT

Sucrose-based polyether polyols which do not promote degradation of HCFC blowing agents are produced by blocking at least 10% of the polyol's hydroxyl groups with a compound represented by the formula $CH_3COCH_2COOR$ in which R represents an alkyl group. These polyether polyols are particularly useful in the production of polyurethane foams.

6 Claims, No Drawings

POLYOLS FOR THE PRODUCTION OF FOAMS WITH HCFC BLOWING AGENTS

BACKGROUND OF THE INVENTION

The present invention relates to polyols useful in a process for the production of polyurethane foams with hydrohalocarbon blowing agents.

Processes for the production of rigid polyurethane foams are known. Sucrose-based polyols are of particular interest as the primary isocyanate-reactive reactant because of their relatively low cost and because they are relatively simple to produce. Processes for producing such sucrose-based polyols are disclosed, for example, in U.S. Pat. Nos. 3,085,085; 3,153,002; 3,222,357; and 4,430,490. Each of these patents teaches that the disclosed polyols are useful in the production of polyurethane foams.

At the present time, a major concern of foam producers, particularly rigid foam producers, is the development of rigid foam systems in which the chlorofluorocarbon blowing agent is replaced with a more environmentally acceptable blowing agent. HCFCs (i.e., hydrogen containing chlorofluorocarbon) and blends of HCFCs with other materials are presently considered to be possible alternatives.

U.S. Pat. No. 4,900,365, for example, teaches that a mixture of trichlorofluoromethane, a dichlorofluoroethane selected from a specified group and isopentane is useful as a blowing agent for the preparation of polyurethane foams. Dishart et al's paper entitled "The DuPont Program on Fluorocarbon Alternative Blowing Agents for Polyurethane Foams", *Polyurethanes World Congress 1987*, pages 59–66 discusses the investigation of various HCFCs as possible blowing agents for rigid polyurethane foams. Neither of these disclosures, however, teaches a process for the production of rigid polyurethane foams having good physical properties from sucrose-based polyols only with an HCFC blowing agent. In fact, Dishart et al teaches that conventional sucrose-based polyols produced foams which became soft, shrank and in some cases collapsed when HCFC-123 was used as the blowing agent. It was only when the sucrose-based polyol was used in combination with a urea-based polyol that a relatively stable foam having good properties obtained.

One of the problems encountered with HCFCs is that they tend to degrade under foam-forming conditions to a greater extent than their chlorofluorocarbon predecessors. The hydrohalocarbons undergo dehydrohalogenation to form halogenated alkenes. They may also undergo reduction reactions in which halogen atoms are replaced with hydrogen.

One solution to the HCFC degradation problem which was suggested by Hammel et al in their paper entitled, "Decomposition of HCFC-123, HCFC-123a, and HCFC-141b in Polyurethane Premix and in Foam", was to wait to add the HCFC to the foam-forming mixture until just before use. This solution is not, however, practical in commercial foam production processes.

Means for stabilizing hydrohalocarbons under foam-forming conditions have therefore been sought by those in the art. U.S. Pat. No. 5,137,929, for example, teaches that inclusion of certain types of stabilizers in a foam forming mixture reduces the amount of decomposition of hydrohalocarbon blowing agent during the foaming process. Among the materials taught to be useful as stabilizers are esters, organic acids, anhydrides, aminoacids, ammonium salts, bromoalkanes, bromoalcohols, bromoaromatic esters, chloroalcohols, nitroalkanes, nitroalcohols, triarylmethyl chlorides, triarylmethyl bromides, 3-sulfolene, zinc dialkyldithiophosphate, haloalkyl phosphate esters, carbon molecular sieves, powdered activated carbon, zeolite molecular sieves, sulfonate esters, and haloalkyl phosphate esters. This patent does not, however, teach or suggest that the polyol employed in the foam forming mixture be modified to stabilize the hydrohalocarbon blowing agent.

In their paper entitled, "Minimization of HCFC-141b Decomposition in Rigid Polyisocyanurate Foams", Bodnar et al take a different approach. Bodnar et al recommend that the catalyst employed in the foam forming reaction be selected so than any compatibilizer present in the polyol will not be able to solvate the cation of the catalyst and thereby render the anion of the catalyst more reactive.

Nowhere in the prior art is it taught or suggested that use of a sucrose-based polyol in which some of the hydroxyl groups were blocked would substantially reduce or eliminate the degradation of hydrohalocarbon blowing agents.

SUMMARY OF THE INVENTION

It is an object of the present invention to provide polyols which are particularly useful in a process for the production of polyurethane foams in which a hydrohalocarbon (HCFC) is used as the primary blowing agent.

It is also an object of the present invention to provide a sucrose-based polyol which is useful in a process for the production of polyurethane foams with an HCFC blowing agent which foams have good physical properties.

It is a further object of the present invention to provide a polyol which will not promote the dehydrohalogenation of an HCFC blowing agent.

It is another object of the present invention to provide a process for producing polyurethane foams from these polyols.

These and other objects which will be apparent to those skilled in the an are accomplished by reacting an organic polyisocyanate with a sucrose-based polyether polyol in which at least 10% of the hydroxyl groups have been blocked with a group corresponding to Formula I (given below) having a molecular weight of from about 350 to about 1200 in the presence of a hydrogen-containing chlorofluorocarbon blowing agent and a catalyst.

DETAILED DESCRIPTION OF THE PREFERRED EMBODIMENTS OF THE PRESENT INVENTION

The present invention is directed to polyols useful in a process for the production of polyurethane foams with a hydrohalocarbon blowing agent, a process for producing foams in which those polyols are employed and to the foams produced with these polyols. In the process of the present invention, an organic isocyanate is reacted with a sucrose-based polyether polyol in which at least 10%, preferably from about 10 to about 60%, most preferably from about 20 to about 50% of the polyhydroxyl groups are blocked with a group derived from a compound represented by the formula $$CH_3-CO-CH_2-COOR \qquad (I)$$

in which

R represents an alkyl group such as a methyl, ethyl, propyl, butyl, isobutyl, or tertiary butyl group, with the tertiary butyl group being preferred in the presence of a hydrohalocarbon blowing agent and a catalyst.

Any of the known organic isocyanates may be used to produce polyurethane foams in accordance with the process of the present invention. Isocyanates which may be used include aromatic, aliphatic, and cycloaliphatic polyisocyanates and combinations thereof. Examples of suitable isocyanates are: diisocyanates such as m-phenylene diisocyanate, p-phenylene diisocyanate, 2,4-toluene diiso-cyanate, 2,6-toluene diisocyanate, 1,6-hexamethylene diisocyanate, 1,4-hexamethylene diisocyanate, 1,4-cyclohexane diisocyanate, hexahydrotoluene diisocyanate and its isomers, 1,5-naphthylene diisocyanate, 1-methylphenyl-2,4-phenyl diisocyanate, 4,4'-diphenylmethane diisocyanate, 2,4'-diphenylmethane diisocyanate, 4,4'-biphenylene diisocyanate, 3,3'-dimethoxy-4,4'-biphenylene diisocyanate and 3,3'-dimethyl-diphenyl-propane-4,4'-diisocyanate; triisocyanates such as 2,4,6-toluene triisocyanate; and polyisocyanates such as 4,4'-dimethyl-diphenyl-methane-2,2',5,5'-tetraisocyanate and the polymethylene polyphenylpolyisocyanates.

A crude polyisocyanate may also be used in making polyurethanes by the process of the present invention. The crude toluene diisocyanate obtained by phosgenating a mixture of toluene diamines and the crude diphenylmethane diisocyanate obtained by phosgenating crude diphenylmethanediamine are examples of suitable crude polyisocyanates. Suitable undistilled or crude polyisocyanates are disclosed in U.S. Pat. No. 3,215,652.

Preferred polyisocyanates for the production of rigid polyurethanes are methylene-bridged polyphenyl polyisocyanates and prepolymers of methylene-bridged polyphenyl polyisocyanates having an average functionality of from about 1.8 to about 3.5, preferably from about 2.0 to about 3.1 isocyanate moieties per molecule and an NCO content of from about 28 to about 34% by weight, due to their ability to crosslink the polyurethane.

The polyisocyanate is generally used in an amount such that the isocyanate index (i.e., the ratio of equivalents of isocyanate groups to equivalents of isocyanate-reactive groups times 100) is from about 90 to about 110, preferably from about 100 to about 105.

The polyols employed in the process of the present invention are polyether polyols prepared by reacting sucrose with an alkylene oxide such as ethylene oxide and/or propylene oxide in the presence of an alkaline catalyst. The product mixture is then treated with a hydroxycarboxylic acid so as to neutralize the alkaline catalyst. U.S. Pat. No. 4,430,490 which discloses a suitable process is incorporated herein by reference.

The sucrose-based polyols used in the practice of the present invention generally have an average molecular weight of from about 350 to about 1200, preferably from about 450 to about 850.

The acid used to neutralize the alkaline catalyst present in the polyol may be any acid which reacts with the alkaline catalyst to produce a material which is soluble in the polyether. Examples of suitable acids include: lactic acid, salicylic acid, substituted salicylic acid such as 2-hydroxy 3-methyl benzoic acid, 2-hydroxy 4-methyl benzoic acid and mixtures of such acids.

The alkaline catalyst present in the polyol may also be neutralized with an acid which forms an insoluble salt that may subsequently be removed by filtration. Examples of such acids are sulfuric acid and carbonic acid formed in situ from carbon dioxide and water.

The neutralized polyether polyol is then reacted with a compound represented by Formula I at a temperature of at least 140° C., preferably from about 140° to about 200° C. until the desired degree of capping has been achieved. Generally, the compound represented by Formula 1 is used in an amount sufficient to block at least 10%, preferably from about 10 to about 60%, most preferably from about 20 to about 50% of the hydroxyl groups of the neutralized polyether polyol.

The blocked, sucrose-based polyether polyol is generally included in foam forming mixtures in an amount of from about 10 to about 40% by weight, based on the total foam-forming mixture, preferably from about 15 to about 30% by weight.

The blowing agent employed in the process of the present invention may be any one of the known hydrogen-containing chlorofluorocarbons. The preferred blowing agents are 1,1-dichloro-2,2,2-trifluoroethane (HCFC-123), 1,1-dichloro-1-fluoroethane (HCFC-141b), and 1,1,1,4,4-hexafluorobutane (HFC-356). The blowing agent is generally included in a foam-forming mixture in an amount of from about 5 to about 20% by weight, based on the total weight of all of the reactants, preferably from about 7 to about 15% by weight.

Any of the catalysts known to be useful in the production of rigid polyurethane foams may be employed to produce polyurethane foams in accordance with the process of the present invention. The preferred catalysts are triethylenediamine (TEDA), bis-(dimethylaminoethyl)-ether (BDMAEE), pentamethyldiethylenetriamine (PMDETA), trimethylaminoethylethanolamine (TMAEEA), dimethylethanolamine (DMEA) and dimethylaminopropylamine (DMAPA).

Low molecular weight polyols, i.e., polyols having a molecular weight of less than 350 may optionally be included in foam forming mixtures containing the blocked sucrose-based polyether polyols of the present invention.

Other materials which may optionally be included in the foam-forming mixtures of the present invention are any of the known surfactants, pigments, colorants, fillers, antioxidants, flame retardants, and stabilizers.

In the practice of the present invention, the polyisocyanate, blocked sucrose-based polyether polyols and any optional materials are generally used in an amount such that the equivalent ratio of isocyanate to isocyanate reactive groups is from about 0.9:1 to about 1.1:1, preferably from about 1.0:1 to about 1.05:1.

Foams may be produced from the blocked polyether polyols of the present invention in accordance with any of the known foam-forming techniques using conventional apparatus.

Having thus described our invention, the following Examples are given as being illustrative thereof. All pads and percentages given in these Examples are pads by weight and percentages by weight, unless otherwise indicated.

EXAMPLES

The materials used in the following Examples were as follows:

POLYOL A: a polyether polyol formed by reacting sucrose, propylene glycol and water with propylene oxide in the presence of a base and subsequently neutralizing the reaction mixture with sulfuric acid. This polyol had more than 4 isocyanate reactive hydrogen atoms and an OH number of 470.

POLYOL B: POLYOL A in which 50% of the hydroxyl groups were blocked with t-butyl acetoacetate. This polyol was prepared by introducing 2478 grams of POLYOL A and 1662.1 grams of t-butyl acetoacetate into a reaction vessel, heating the reaction vessel to 160° C., and monitoring the reaction until formation of t-butanol ceased. The contents of the reaction vessel were then cooled to 115° C. and any residual t-butyl acetoacetate and/or t-butanol were removed by vacuum distillation.

POLYOL C: a sucrose-initiated polyether polyol formed by reacting sucrose, propylene oxide and water with first ethylene oxide (30% of total alkylene oxide) and then propylene oxide (70% of total alkylene oxide) in the presence of a base and subsequently neutralizing the reaction mixture with lactic acid. This polyol had an OH number of 475.2.

POLYOL D: POLYOL C in which 50% of the hydroxyl groups were blocked by reacting POLYOL C with t-butyl acetoacetate at elevated temperature. This polyol was prepared by introducing 2600 grams of POLYOL C and 1724 grams of t-butyl acetoacetate into a reaction vessel, heating the contents of the reaction vessel to a temperature of 160° C., and monitoring the reaction until formation of t-butanol ceased. The contents of the reaction vessel were then cooled to 115° C. and any residual t-butyl acetoacetate and/or t-butanol were removed by vacuum distillation.

POLYOL E: POLYOL C in which 40% of the hydroxyl groups were blocked with t-butyl acetoacetate. This polyol was formed by introducing 2500 grams of POLYOL C and 1327.9 gram of t-butyl acetoacetate into a reaction vessel, heating the contents of the reaction vessel to a temperature of 160° C. and monitoring the reaction until formation of t-butanol ceased. The contents of the reaction vessel were then cooled to 115° C. and any residual t-butyl acetoacetate and/or t-butanol were removed by vacuum distillation.

POLYOL F: POLYOL C in which 30% of the hydroxyl groups were blocked with t-butyl acetoacetate. This polyol was formed by introducing 2700 grams of POLYOL C and 1074.3 grams of t-butyl acetoacetate into a reaction vessel, heating the contents of the reaction vessel to a temperature of 160° C. and monitoring the reaction until the formation of t-butanol ceased. The contents of the reaction vessel were then cooled to 120° C. and any residual t-butyl acetoacetate and/or t-butanol was removed by vacuum distillation.

POLYOL G: POLYOL C in which 20% of the hydroxyl groups were blocked with t-butyl acetoacetate. This polyol was prepared by introducing 2945.2 grams of POLYOL C and 781.2 grams of t-butyl acetoacetate into a reaction vessel, heating the contents of the reaction vessel to a temperature of 160° C. and monitoring the reaction until the formation of t-butanol ceased. The contents of the reaction vessel were then cooled to 120° C. and any residual t-butyl acetoacetate and/or t-butanol was removed by vacuum distillation.

POLYOL H: POLYOL C in which 10% of the hydroxyl groups were blocked with t-butyl acetoacetate. This polyol was prepared by introducing 3078 grams of POLYOL C and 408.2 grams of t-butyl acetoacetate into a reaction vessel, heating the contents of the reaction vessel to a temperature of 160° C. and monitoring the reaction until the formation of t-butanol ceased. The contents of the reaction vessel were then cooled to 120° C. and any residual t-butyl acetoacetate and/or t-butanol was removed by vacuum distillation.

POLYOL I: A polyether polyol formed by reacting a mixture of sucrose, monoethanol amine and water with propylene oxide in the presence of a base and subsequently neutralizing the reaction mixture with lactic acid. This polyol had an OH number of 510.

POLYOL J: POLYOL 1 in which 50% of the hydroxyl groups were blocked with t-butyl acetoacetate. This polyol was prepared by introducing 2500 grams of POLYOL I and 1798.7 grams of t-butyl acetoacetate into a reaction vessel, heating the contents of the reaction vessel to a temperature of 160° C. and monitoring the reaction until the formation of t-butanol ceased. The contents of the reaction vessel were then cooled to 120° C. and any residual t-butyl acetoacetate and/or t-butanol was removed by vacuum distillation.

HCFC-141b: 1,1-dichloro-1-fluoroethane.
HCFC-1131a: 1-chloro-1-fluoroethylene.

EXAMPLES 1.6 grams of each of POLYOLS A, B, C, D, E, F, G, H, I and J were combined with 0.4 grams of HCFC-141b in a 50 ml vial which was sealed with a polytetrafluoroethylene septum. Each of these samples was then heated to 140° C. for 16 hours. The temperature was then reduced to 80° and the contents of the vial were maintained at that temperature for 24 hours. The sample was then analyzed by gas chromatography to determine the amount of dehydrohalogenation product, HCFC-1131a present. The results are reported in Table 1.

TABLE 1

| POLYOL | $\mu$g HCFC-1131 per gram of HCFC-141b |
|---|---|
| A* | 0 |
| B | 0 |
| C* | 805 |
| D | 188 |
| E | 498 |
| F | 195 |
| G | 311 |
| H | 533 |
| I* | 2878 |
| J | 554 |

*Comparative

The data in Table 1 suggest that sucrose-based polyols which have been neutralized with sulfuric acid are not as likely to degrade HCFC-141$b$ as are sucrose-based polyols which have been neutralized with lactic acid. Blocking of at least 10% of the hydroxyl groups of the sucrose-based polyols in accordance with the present invention significantly reduced HCFC-141b degradation in lactic acid neutralized polyols.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A polyol composition useful in the production of polyurethane foams comprising:
   a) a sucrose-based polyether polyol in which at least 10% of the hydroxyl groups have been capped with a compound represented by the formula $$CH_3-CO-CH_2-COO-R$$

in which

R represents an alkyl group; and
   b) a hydrohalocarbon blowing agent.

2. The polyol composition of claim 1 in which the R group of Formula 1 is t-butyl.

3. The polyol composition of claim 2 in which the hydrohalocarbon blowing agent is HCFC-141b.

4. The polyol composition of claim 1 in which the hydrohalocarbon blowing agent is HCFC-141b.

5. The polyol composition of claim 1 which further includes a catalyst.

6. The polyol composition of claim 1 which further includes a flame retardant.

* * * * *